May 29, 1945.  H. T. BUSSMANN  2,376,863
ELECTRIC PROTECTIVE DEVICE
Filed Dec. 16, 1936  2 Sheets-Sheet 2
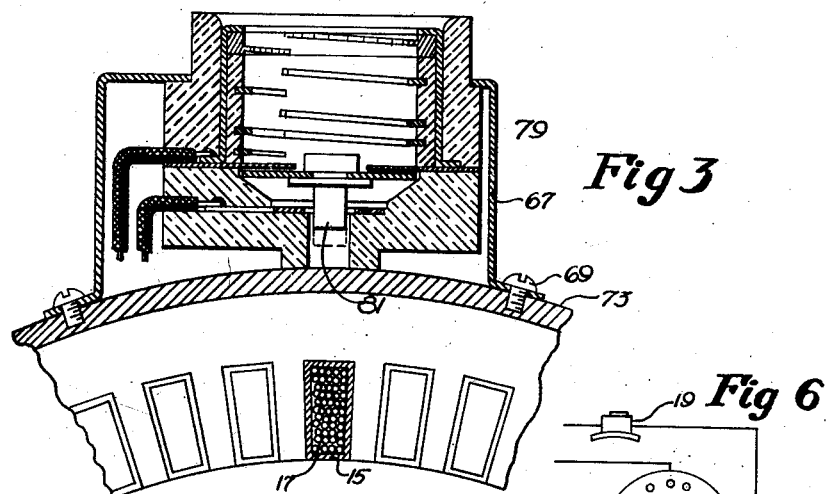
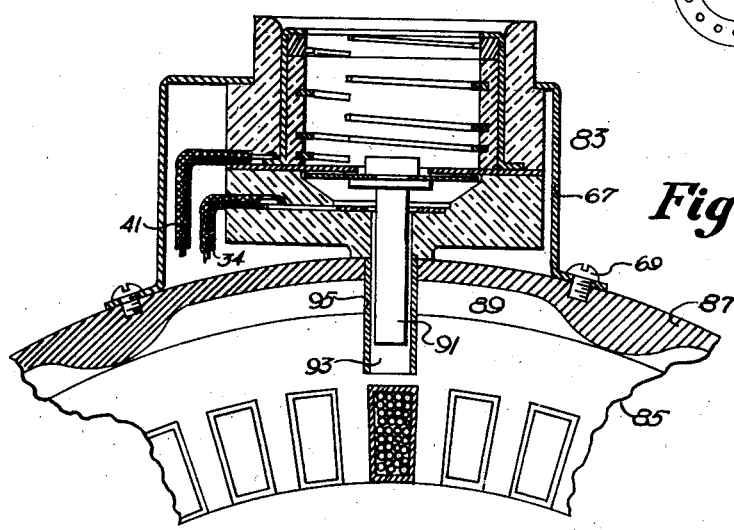
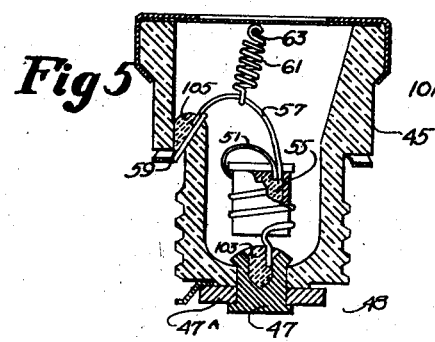
INVENTOR.
Henry T. Bussmann
BY
Roy M. Eilers
ATTORNEY.

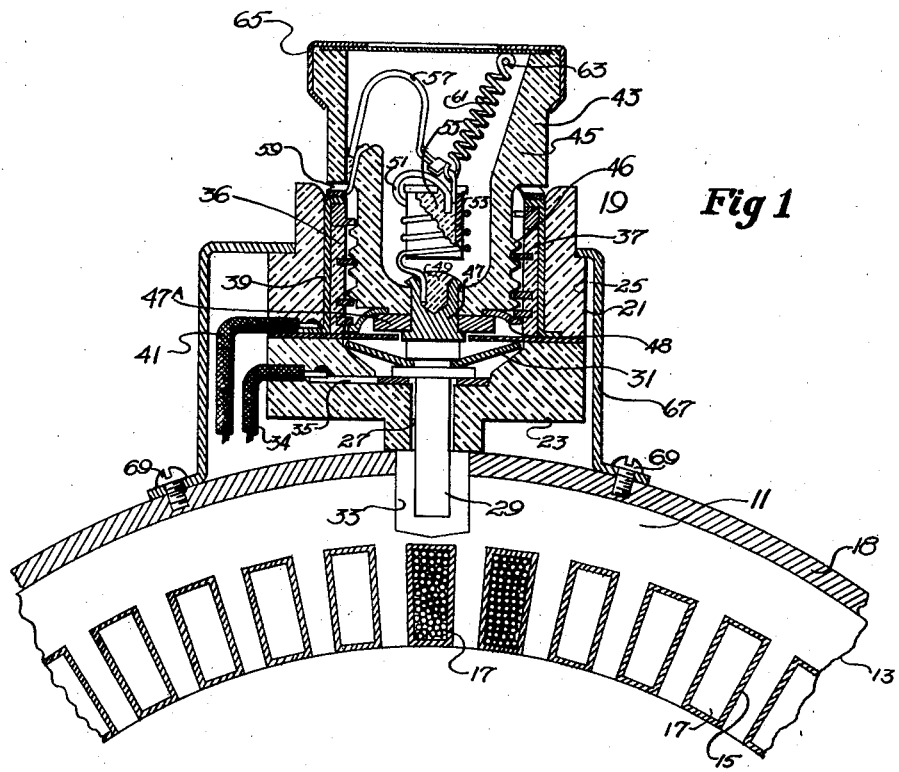

Patented May 29, 1945

2,376,863

UNITED STATES PATENT OFFICE 2,376,863

ELECTRIC PROTECTIVE DEVICE

Henry T. Bussmann, St. Louis, Mo.

Application December 16, 1936, Serial No. 116,089

31 Claims. (Cl. 200—123)

My invention relates to protective devices and particularly to thermal electric protective devices.

An object of my invention is to provide a unitary thermal circuit protective device having a plurality of circuit interruptors that shall be selectively effective to automatically open the circuit under overload conditions.

Another object of my invention is to provide a unitary thermal motor protective device having a plurality of series connected circuit interruptors selectively operable at extreme, heavy and moderate overload currents and with time lags substantially inversely proportional to the severity of the overload.

Another object of my invention is to provide a unitary thermal motor protective device that may be connected in the circuit remote from the motor or that may be easily and quickly mounted on a motor in heat receiving relation thereto.

Another object of my invention is to provide a unitary thermal protective device having time lags at different overloads comparable to those of the energy translating device to be protected and responsive to the current flowing through the energy translating device and, when mounted in heat receiving relation thereto, is responsive also to the temperature of the device to be protected.

Still another object of my invention is to provide a unitary thermal cutout applicable to various types of electrical energy translating devices that shall control directly the entire current transversing the translating device.

Other objects of my invention will either be apparent from the following description of devices embodying my invention or will be specifically pointed out hereinafter in the course of such description.

It is very desirable that an energy translating device be provided with a circuit protector of a kind which will have different time lags in order to protect the energy translating device in a proper manner when the device is subjected to overload currents of different degrees of severity and length of time. Thus it is necessary that the circuit of an energy translating device be opened substantially instantaneously in case the device is traversed by a current corresponding to an extremely heavy overload or to a short circuit, in order that not only the translating device but the circuit including the same shall be protected from damage thereto. In the case of lower overloads the length of time before opening of the circuit can be correspondingly increased.

In case of heavy overloads it may be desirable that the circuit remain closed for an appreciable time, the length of time depending upon the conditions of the translating device as to prior operation, as well as to its heat storage capacity. The heat storage capacity is obviously a function of the amount of material in an energy translating device, such as a motor, and of its design and the greater the heat storage capacity the longer the time during which a motor can safely carry a given overload or the greater the overload which a motor can carry during a given length of time.

In the case of moderate overloads it may be desirable that this load be permitted to continue for a greater length of time, this length of time again depending not only upon the heat storage capacity of the motor but also upon the preceding conditions of load which of course may have appreciably increased the temperature of the so-called "hot spot" of the energy translating device above that of the surrounding atmosphere.

In the drawings,

Figure 1 is a view in lateral section through an assembly including a device embodying my invention shown as being mounted on an electric motor, the motor being shown in part only.

Fig. 2 is a fragmentary view similar to Fig. 1 of the drawings, but showing a modified protector socket only, mounted on a motor, Figs. 3 and 4 are views similar to Fig. 2, but showing other modified forms of the protector socket, Fig. 5 is a sectional view of a different form of the protective device embodying my invention, and Fig. 6 is a diagram of connections of my improved thermal protective device as associated with an induction motor.

Referring first to Fig. 1 of the drawings, I have there illustrated an electric motor 11 by a set of stator laminations 13 having a plurality of slots 15 therein within which an energizing winding 17 may be located. An outer casing 18 may also be provided, but it is to be understood that the showing of the electric motor is general only.

A unitary thermal protective device or cutout 19 comprises a socket 21 made of a suitable electric insulating material and which may be made in two parts 23 and 25, the part 23 having a central aperture 27 therein to receive a heat conducting pin 29 which is resiliently supported upon a normally flat disc 31 and which is adapted to extend into an opening 33 in the motor frame structure, the dimensions of the opening 33 being such that there will be a clearance between the outside surface of the pin 29 and the wall of the opening 33, for insulation purposes. The socket portion 23 includes also a conductor 34 which is normally in electric-conducting engagement with a part of the pin 29 through a flat metal strip 35.

The socket portion 25 is of substantially circular shape, with an inner casing 36, of electric-insulating material therein, having a plurality of suitable screw threads 37 thereon, and which includes also a metal shell 39 suitably held between the socket part 25 and the inner casing 36 and having a second current lead 41 secured thereto at its lower end and whereby the cutout including the leads 34 and 41 may be connected in series circuit with the motor energizing winding in order to directly control the circuit and interrupt the same whenever caused to do so by certain overload conditions. It is to be understood that I do not limit myself to the particular details of socket described above, which type of socket may be used if tamper-proof characteristics are desired, but that any other structure effective for the same purpose may be used.

A removable plug fuse 43 is operatively associated with the socket 21 and includes a body portion 45 which may be made of any suitable electric-insulating material having external screw threads 46 and which has a substantially fixed contact member 47 located centrally thereof at its inner end and projecting therefrom such a distance that it will engage the contact pin 29 and force it inwardly into substantially the position shown in Fig. 1 of the drawings, when the plug 43 is screwed into the socket 21, so that it will be in proper operative and circuit closing position relatively to the motor structure. The contact member 47 extends through a metal washer 47a, which washer clamps a single turn metal screw thread member 48 against the end of body 45.

The contact terminal 47 supports a mass 49 of fusible material at its inner end, which fusible material may be either electric conducting or electric non-conducting as may be desired.

A heat coil located within the hollow body of the plug fuse includes a resistor wire 51 which may be wound to open helical form, although this is not absolutely necessary but may be desirable to receive therein a container 53 which may be either of metal or of some electric non-conducting material such as glass, and which contains a heat softenable mass 55 which may be either electric-conducting or electric non-conducting. If the container 53 is a conductor, the wire 51 should be insulated therefrom except at its upper and. One end of the resistor wire 51 is adapted to be held in electrical engagement with the contact member 47 by the mass 49, while the other end thereof is adapted to be held in electrical engagement with one end of a fuse link 57, by the mass 55 of fusible material located in the container 53. Of course it is not necessary that the one end of resistor wire 51 be in mechanical engagement with member 47 nor that the ends of resistor wire 51 and of fuse link 57 be in mechanical engagement if the fusible masses 49 and 55 are electric conducting.

The other end of fuse link 57 is connected to a suitable terminal 59 on the fuse plug 43 so that it may engage with the upper end of shell 39 when the fuse plug is screwed tightly into the socket.

The embedded end of fuse link 57 has operatively connected thereto a spring 61, the other end of which is held by some suitable means as a pin 63 in the upper or outer end of plug 43 so that the embedded end of fuse link 57 is normally held under tension tending to pull it out of the fusible mass 55 and out of electrical engagement with the heat coil 51. A suitable cover member 65, which may be partly of transparent material is also provided.

The socket 21 may be so designed that a casing 67 may be associated therewith, which casing is adapted to be clamped against the outside of the motor frame or housing and held there by small machine screw 69 or other suitable securing means.

The operation of the device shown in Fig. 1 of the drawings is substantially as follows: It will be noted that the heat conducting pin 29 is so located that it is in substantially radial alinement with one of the coils 17 of the energizing winding, so that there will be provided a relatively short distance for the flow of heat from the energizing winding of the motor to the heat conducting pin. When the motor is operated the heat generated not only in the energizing winding of the motor, but also in the iron parts thereof by hysteresis and eddy currents, will gradually heat up the motor including the walls of opening 33 and heat will be radiated to the pin 29 and by it conducted to the contact terminal 47. Should the motor become too hot because of a long continued overload, enough heat will be conducted to the mass 49 to cause it to soften. Upon a sufficient softening of the fusible mass 49, the spring 61 will be effective to move the heat coil 51 upwardly to thereby break the contact between the end of the resistor wire and the terminal 47 and to thereby interrupt the motor circuit.

The design and construction of the plug fuse 43 is such that a certain amount of heat will be generated in heat coil 51, part of which will be conducted to the fusible mass 49 even at times of moderate overloads of the kind just above described. Accordingly, on long-continued low overloads the protective may operate to open the circuit at this point independent of heat from a motor if the heat softenable mass 49 has suitable characteristics.

In case of a heavy overload, that is one greater than the moderate overload just described, the amount of heat generated by the resistor 51 will be much greater and will be sufficient, if the heavy overload is continued long enough, to soften the mass 55 and the tension spring 61 will ultimately be effective to draw the embedded end of fuse link 57 out of engagement with the wire 51 to thereby interrupt the electrical circuit of the device. Mass 55 will soften before mass 49 under this heavier overload condition, because the contact member 47, washer 47a, screw thread member 48 and pin 27 absorb or conduct away heat from mass 49 so much faster than the much smaller mass of the fuse strip 57 and spring 61 will absorb or conduct away heat from mass 55. It is obvious that this method of operation will provide a quick break because the spring 61 is given sufficient tension to permit it to effect such disengagement very quickly when permitted to do so by the softening of either of the masses of fusible material.

In case of an extremely heavy overload such as a short circuit, the fusible member 57 will blow substantially instantaneously to thereby interrupt the circuit before any parts of either the circuit or the energy translating devices can be damaged by the effects of the very large current flowing under those conditions.

I am aware of the fact that as described herein there will be an interchange of heat between the individual parts thereof, that, for example, the heat of the motor on which my device is mounted, will cause some increase in temperature in all parts of the protector, that the heat from the heat coil will tend to cause some increase in temperature in both the fuse link and in the fusible mass next to the member for conducting heat from the motor to the device, but such heat interchange is not great enough to prevent the operation of my protective device in the manner described. Thus at high overloads the fuse link blows because of the heat generated in the fuse link itself, at lower overloads one of the fusible masses is softened mainly because of the heat transmitted theretofrom the heat coil in which the heat is generated, and at still lower overloads the other fusible mass is softened mainly because of heat conducted thereto from the motor in which it is generated. Thus the heat which is mainly depended on for the operation of the protective device under different current conditions, is heat generated in different places in accordance with these conditions.

Referring to Fig. 2 of the drawings, I have there illustrated a socket 71 mounted on a motor frame or housing 73, and having a relatively short heat conducting pin 75, the inner end of which is held out of direct engagement with the motor frame 73 by a thin sheet of electric-insulating material 77. In other respects the socket 71 is substantially the same as was hereinbefore described for the socket 21 in Fig. 1 of the drawings, and it is to be understood that a plug fuse 43 of the kind already described is to be operatively associated with the socket 71. I have found it possible to use a socket of this general kind when the motor with which it is to be associated and on the surface of which it is to be mounted is not subject to any appreciable ventilation draft at the point where the thermal cutout is to be mounted.

Referring now to Fig. 3 of the drawings, I have there illustrated another form of socket 79 in which the central contact 81 is also short but is held out of direct or out of immediate engagement with the surface of the motor frame 73 and it is only necessary that the distance between the outer end of the pin 81 and the motor frame 73 be not less than one-eighth inch in order to provide suitable electrical insulation therebetween.

Referring now to Fig. 4 of the drawings, I have there illustrated another modification of socket 83 which I prefer to use when it is to be operatively associated with a ventilated type of motor. The motor stator 85 may have located therearound a housing 87 with a plurality of spaces 89 therebetween and in such case the socket 83 has located therein a central contact 91 serving of course also as the heat conducting pin which extends into a recess or opening 93 in the stator 85, there being provided also a tubular member 95 of electric-insulating material in order to protect the heat conducting contact terminal 91 from the cooling effects of air flowing through the space 89 through which it extends.

In those cases where for various reasons connected with the design of the motor and the mounting of my improved thermal cutout thereon, it is found that an appreciable temperature drop exists between the heat conducting pin and the heated parts of the motor, the tubular member 95 may be used in the recess 23 shown in Fig. 1 of the drawings, the inner diameter of such tubular member being slightly greater than the outer diameter of the pin 29 (shown in Fig. 1 of the drawings) to thereby provide a heat conducting path of lower thermal reluctance. This provides a very simple means for varying the thermal reluctance of the heat path to the heat conducting pin 29 which I make use of whenever necessary in order to effect proper correlation of the thermal device and the energy translating device so that the thermal device will interrupt the circuit at the desired times responsive to the degree of overload and the time of continuance of such overloads.

While I have shown my thermal overload protective device in Figs. 1 to 4 inclusive, as being mounted on an electric energy translating device, such as a motor, it is not limited to being operated in such position, but may be mounted in a suitable socket out of thermal communication with an energy translating device. Thus the plug fuse 43 may be positioned in a cooperating socket adapted to connect the fuse in the energizing circuit of a motor or other electric energy translating device. In this case, since the heat conducted to the contact terminal 47 is absent, I may make the heat softenable material 49 such that it will lose its holding power at a temperature below that at which mass 55 loses its holding power. The protective device 43 will therefore be actuated and controlled solely by heat generated in the protective device by an electric current flowing through it, but it will open the circuit in the protective device in substantially the same manner as hereinbefore described. The conduction of heat from the heat softenable material 49 by the relatively heavy mass of terminal 47 and the center contact of the socket with which terminal 47 cooperates tends to retard the temperature rise of the heat softenable material 49 and affords a time lag comparable to that of the energy translating device protected thereby.

Referring now to Fig. 5, I have there illustrated a slightly modified form of protective device 101, which differs from that shown in Fig. 1 in only a few details. The electric connection between the heat coil 51 and the contact terminal 47 is a permanent one, as by the use of a mass 103 of hard solder. The electric connection between the fuse link and the contact terminal 59 is normally maintained by a mass of heat softenable material 105, which may be such as to lose its holding power at a temperature below that at which the mass 55 loses its holding power. The device 101 will operate to open an electric circuit in the same manner as has already been described and in case it is desired to mount this device in heat receiving relation relatively to a motor or other electric energy translating device, it is only necessary to position it in a suitable socket or receptacle, of the general type shown in any one of Figs. 1 to 4.

In case this latter form of device embodying my invention is mounted out of heat receiving relation to the energy translating device protected thereby, the radiation of heat from the fuse link and the conduction of heat from the heat softenable material 105 by the contact terminal 59 and its cooperating contact on the socket tend to retard the temperature rise of the heat softenable material 105 and afford a time lag comparable to that of the energy translating device protected thereby.

In Fig. 6 of the drawings, I have shown a diagram of connections of my thermal cutout connected in electrical series circuit with an induction motor 11. It is obvious from this diagram that the entire current of the energy translating device is carried by the thermal cutout and is also interrupted thereby whenever necessary to do so as determined by the heating conditions of the motor and the effect thereof on the thermal protecting device.

The device embodying my invention thus provides a thermal protective device applicable not only to motors but also to other electrical energy translating devices having current traversed windings and magnetic parts, the protective device being adapted to be mounted on either the magnetic parts of the energy translating device or on the metal supporting parts thereof or out of heat receiving relation therewith, the device being selectively operable to interrupt the circuit of the energy translating device after various lengths of times of the continuance of varying overloads, in accordance with the severity of such overload, that is, the greater the overload, the shorter the length of time which it is permitted to continue.

While I have illustrated and described certain embodiments of devices embodying my invention, I do not desire to be limited thereto, but desire that the appended claims shall be so construed as to cover all devices coming within the scope thereof, which scope is to be limited by the prior art only.

I claim as my invention:

1. An enclosed protector for electric power circuits comprising a fuse link, a heating element, holding means maintaining these members in electrical connection, terminals, a second holding means maintaining one of said members in electrical connection with a terminal, these holding means being adapted to lose their holding powers under different conditions of overload and circuit-opening means to break the circuit at the holding means which first loses its holding power.

2. A unitary protective device comprising a fuse link, a plurality of thermally controlled mechanically operable circuit interrupters including heat softenable materials normally holding them in closed position and adapted to lose their holding powers when heated by overload currents and a circuit opening means adapted to effect selective opening of the respective circuit interrupters in accordance with the values of currents carried by the protective device.

3. A protector for electric circuits comprising contact terminals, members electrically connecting the terminals, said members comprising a resistance element and a fuse link, holding means normally maintaining said members in electrical connection with each other and adapted to lose its holding power when heated above a predetermined temperature, a second holding means normally maintaining one of said members and one of said terminals in electrical connection with each other and adapted to lose its holding power when heated above a predetermined temperature and circuit opening means adapted to open to the circuit when either of said holding means has lost its holding power.

4. A protector for electric circuits comprising a plurality of thermally controlled mechanically operable circuit interrupters selectively operable to open the circuit in accordance with different degrees of overload therein, each interrupter including heat softenable material normally holding said interrupter in closed circuit position and adapted to lose its holding power when heated above a predetermined temperature, and the interrupters including a single opening means adapted to open that one of the interrupters in which the included heat softenable material is the first to lose its holding power.

5. A unitary overload protective device comprising contact terminals and a plurality of thermally controlled mechanically operable circuit interrupters selectively operable to open the circuit in the protective device in accordance with different degrees of overload in the circuit, one of said interrupters including a mass of heat softenable material in contact with one of said contact terminals normally holding said one interrupter in closed position, and another of said interrupters including a mass of heat softenable material normally holding said other interrupter in closed position, said interrupters including a current carrying heating element adapted to heat said masses of heat softenable material.

6. A unitary protective device comprising a plurality of thermally controlled mechanically operable circuit interrupters selectively operable to open the circuit in the protective device in accordance with different degrees of overload in the circuit, said interrupters including a circuit opening means adapted to move a portion of one interrupter to open the circuit when the device is traversed by a current of predetermined value and adapted to move all of said one interrupter and a portion of the second interrupter to open the circuit when the device is traversed by a current of a lower predetermined value.

7. A unitary overload cutout for the protection of electric energy translating devices adapted to be connected in series circuit therewith, said cutout comprising a fuse link and a plurality of thermally controlled mechanically operable circuit interrupters, one of said interrupters being adapted to be heated by heat generated by the passage of the circuit current through a part of the interrupter and to open the circuit when heated to a predetermined operating temperature by an overload current exceeding a predetermined value, a second of said interrupters being adapted to open the circuit when heated to a predetermined operating temperature by an overload current too small to heat the first named interrupter to its operating temperature.

8. A unitary protective device comprising contact terminals, a plurality of thermally controlled mechanically operable circuit interrupters selectively operable to open the motor circuit in accordance with different degrees of overload on the motor, one of said interrupters including one of said contact terminals as a contact member thereof and an operating means becoming effective to open said one circuit interrupter when said contact member has been heated to a predetermined temperature.

9. A unitary protective device adapted to be mounted on a motor, in heat receiving relation therewith, said device comprising a plurality of thermally controlled mechanically operable circuit interrupters selectively operable to open the motor circuit in accordance with different degrees of overload on the motor, one of said interrupters including means to effect opening of the motor circuit when the temperature of said interrupter has reached a predetermined value, the temperature rise of said interrupter being controlled by heat received by the interrupter from the motor.

10. A protective device adapted to be mounted in heat receiving relation to a motor and in series circuit therewith and comprising a plurality of thermally controlled mechanically operable circuit interrupters adapted to operate to interrupt the circuit when heated to predetermined temperatures, the heating of one of said interrupters being controlled by the passage of the motor current through a part of the interrupter and the heating of a second of said interrupters being controlled by the temperature of the motor, the interrupters being selectively operable in accordance with the degree of overload in the motor circuit.

11. A unitary protector for electric energy translating devices adapted to be mounted in heat receiving relation to the device and to be connected in series circuit therewith, said protector comprising a thermal circuit interrupter adapted to become operable when the circuit current has exceeded a predetermined value for a predetermined length of time, a second thermal circuit interrupter adapted to become operable when the temperature of the device to be protected has exceeded a predetermined value for a second predetermined length of time and a means adapted to open the circuit by operating the interrupter which first becomes operable, said opening means being substantially free from current flow therethrough.

12. A unitary motor protective device adapted to be mounted in heat receiving position on a motor and comprising a plurality of thermally-controlled circuit interrupters connected in series circuit with each other and with the motor, one of said interrupters including means to open the motor circuit by the effect of heat generated within itself by the motor current, and another of said interrupters including means to conduct thereto heat generated within the motor and means operatively associated with said other interrupter to effect operation thereof when sufficient heat has been conducted thereto from the motor.

13. A protective device adapted to be mounted on a motor and comprising a fuse link and a pair of thermally-controlled mechanically-operable circuit interrupters, one of said interrupters including means to effect release thereof by heat generated therein by the motor current and the other of said interrupters including means to effect release thereof by heat generated in the motor and conducted thereto.

14. A unitary motor circuit protective device adapted to be mounted on a motor and comprising a fuse strip adapted to blow substantially instantaneously on the passage therethrough of a relatively heavy motor current, an interrupter including a heating element and a mass of fusible material adapted to be heated thereby, the interrupter being adapted to operate in a longer time at a lower motor current and an interrupter including a mass of fusible material and means to conduct thereto heat from the motor and adapted to operate in a still longer time at a still lower motor current.

15. A circuit protective device comprising a casing, contact terminals, a fusible member, a resistance member, masses of heat softenable material normally holding said members in electric connection with each other, and one of said members in electric connection with one of said contact terminals, said masses of heat softenable material being adapted to lose their holding powers when heated to predetermined temperatures, said resistance element being adapted to heat said masses whereby currents of predetermined magnitudes may cause the respective masses to lose their holding powers, said fuse link being adapted to carry said currents without fusing but having a portion adapted to be fused by greater currents before either of said holding masses can be heated sufficiently to lose its holding power and circuit opening means adapted to open the circuit in the protective device when one of said holding masses has lost its holding power.

16. An electric protective device adapted to be held in threaded engagement with a fuse holder and in conductive heat relation to a dynamo-electric machine and comprising a pair of terminals, a fuse link and heat softenable material electrically connected in series relationship with the terminals, said heat softenable material being arranged to receive heat from the dynamo-electric machine and upon the attainment of a predetermined temperature to become softened to permit the opening of the circuit.

17. An electrical protective device arranged to be held in threaded engagement with a fuse holder and in conductive heat relation to a dynamo-electric machine, terminals arranged to be held in contact with the terminals of the fuse holder, a fuse link member, a heat coil member and a plurality of circuit interrupters of heat softenable material electrically connected in series relation between the terminals of the protective device, one of said interrupters holding one of said members to a terminal and being arranged to receive heat from the dynamo-electric machine and adapted to permit opening the circuit when heated to a predetermined temperature, another of said interrupters being positioned between said last mentioned member and the other terminal.

18. In a thermal circuit interrupter, a casing having terminals, a fuse link extended between said terminals, a mass of readily fusible metal connecting said fuse link with one terminal, said fuse link having as a unitary part thereof a short-circuit blowing section and a relatively large mass of heat absorbing material additional to the link between said short-circuit blowing section and said readily fusible metal to delay the fusing of the latter, and means for interrupting the circuit through the interrupter in response to the fusing of said readily fusible metal.

19. In a thermal circuit interrupter, a casing having terminals, a fuse link extended between said terminals, a readily fusible metal connecting said fuse link with one terminal, said fuse link having an intermediate portion of reduced cross sectional area, a heat absorbing mass secured to said link between said readily fusible metal and said reduced area portion, and spring means for effecting separation of said link from said one terminal upon the fusing of the readily fusible metal.

20. In a thermal circuit interrupter, a casing having terminals, a fuse link extended between said terminals having a heat absorbent mass attached to one end thereof and having an intermediate fusing portion, a readily fusible metal connecting said heat absorbing mass with one terminal, and spring means for separating said heat absorbing mass from said one terminal and readily fusible metal upon the fusing of the latter.

21. In a thermal circuit interrupter, a casing having terminals, a fuse link extended between said terminals having a heat absorbent mass attached to one end thereof and having an intermediate fusing portion, a readily fusible metal connecting said heat absorbing mass with one terminal, and spring means for separating said heat absorbing mass from said one terminal and readily fusible metal upon the fusing of the latter, said one terminal being long and having a contact face at one end thereof and having the readily fusible metal attached to the other face thereof.

22. A protector for electric circuits comprising a terminal, means adapted to generate heat when current passes through the protector, heat softenable material contacting said terminal and normally holding said heat generating means and said terminal in electrical conducting relation, said heat softenable material being adapted to lose its holding power when heated to a predetermined temperature, said heat generating means having a portion adapted to fuse and thereby open the circuit on predetermined overload of the protector, a heat absorbing mass secured to and movable with said heat generating means, and a resilient member adapted to move said heat generating means and said heat absorbing mass to break said electrical conducting relation between said heat generating means and said terminal when said heat softenable material loses its holding power.

23. A protector for electric circuits comprising a terminal, heat generating means, heat softenable material in good thermal and electrical conducting relation with said terminal and normally holding said heat generating means and said terminal in electrical conducting relation, said heat softenable material being adapted to lose its holding power when heated to a predetermined temperature, said heat generating means having a portion adapted to fuse and thereby open the circuit on predetermined overload, a heat absorbing mass carried by and movable with said heat generating means, and a resilient member adapted to move said heat generating means and said heat absorbing mass to break said electrical conducting relation between said heat generating means and said terminal when said heat softenable material loses its holding power.

24. A protector for electric circuits comprising a casing, terminals secured to said casing, one of said terminals having one end thereof extending inwardly of said casing, a recess in said inner end of said one terminal, heat softenable material positioned in said recess, heat generating means, a heat absorbing mass, and a resilient member, said heat softenable material normally holding said heat generating means and said one terminal in electrical conducting relation, said heat generating means having a portion adapted to fuse and thereby open the circuit on predetermined overload of the protector, said heat absorbing mass being carried by said heat generating means intermediate said fusing portion and said one terminal, said resilient member being arranged to act upon said heat generating means at a point between said heat absorbing mass and another of said terminals and to move said heat generating means and said heat absorbing mass to break said electrical conducting relation between said heat generating means and said one terminal and thereby open the circuit when said heat softenable material is heated to a predetermined temperature.

25. A protector for electric circuits comprising means adapted to generate heat when in closed circuit position and current passes through the protector, heat softenable material normally holding said heat generating means in closed circuit position, said heat softenable material being adapted to lose its holding power when heated to a predetermined temperature, said heat generating means having a portion adapted to fuse and thereby open the circuit on predetermined overload of the protector, a heat absorbing mass secured to and movable with said heat generating means and a resilient member adapted to move said fusible portion of said heat generating means and said heat absorbing mass to open circuit position when said heat softenable material loses its holding power.

26. A thermal circuit interrupter comprising a casing, a plurality of terminals secured to said casing, a conductor that is positioned in said casing and extends between and electrically connects said terminals, said conductor having a plurality of portions thereof that are selectively openable to interrupt said electrical connection of said terminals, each of said portions becoming openable without any of the other portions becoming openable, one of said portions becoming openable to interrupt said connection upon the occurrence of an excessively heavy electrical overload in the circuit, another of said portions becoming openable to interrupt said connection upon the occurrence of a lighter electrical overload in the circuit, and a third of said portions becoming openable to interrupt said connection upon the continuance of a still lighter electrical overload in the circuit for a long time, and means acting upon said conductor intermediate the length thereof to bias said conductor to open the circuit.

27. A thermal circuit interrupting device comprising a casing, a plurality of terminals secured to said casing, an electrical conductor that is positioned in said casing and extends between and electrically connects said terminals, one portion of said conductor comprising a fuse link, a second portion of said conductor having the form of a coil and normally being connected to said first portion, a third portion of said conductor comprising heat softenable material, and a resilient member, said coil portion of said conductor normally being in closed circuit position, said resilient member being additional to said conductor and being arranged to act on said conductor intermediate of its length to bias said coil portion of said conductor for movement out of closed circuit position, said one portion of said conductor being adapted to open the circuit on predetermined overloads of the circuit, said heat softenable material being adapted to soften and thereby permit movement of said coil portion of said conductor out of closed circuit position on lighter overloads.

28. A thermal circuit interrupter including external terminals, a conductor extended between and electrically connecting said terminals, a mass of heat absorbent material thermally connected to said conductor, a mass of readily fusible material electrically and mechanically connecting said conductor and said mass of heat absorbent material to one terminal, said conductor being adapted to become heated by the current traversing it and to heat said fusible material and to cause said material to loosen its hold on the conductor, and spring means acting on said conductor and responsive to the fusing of said fusible material to move the conductor and said mass of heat absorbent material away from said one terminal.

29. A thermal circuit interrupter including external terminals, a conductor extended between and electrically connecting said terminals, a mass of heat absorbent material thermally connected to said conductor, a mass of readily fusible metal electrically and mechanically connecting said conductor and heat absorbent mass to one terminal, said conductor being adapted to become heated by the current traversing it and to heat said fusible metal and to cause said metal to loosen its hold on the conductor, and spring means operative to effect separation of the conductor and heat absorbent mass from said one terminal, said conductor comprising a fusible link supporting said mass of heat absorbent material having a part adapted to fuse to interrupt the circuit when the conductor is traversed by a sufficiently heavy current.

30. A thermal circuit interrupting device of the plug type comprising a casing having means providing screw threads and a terminal and a center contact, a conductor extended between and electrically connecting said terminal and center contact and being connected with said center contact by a readily fusible mass that is in thermal association with the conductor, said conductor adapted to be heated by sufficient current traversing it for a sufficient period of time to effect the heating of said fusible metal to cause it to release its hold upon said conductor, a heat absorbent mass thermally connected to said conductor, and spring means operative upon sufficient weakening of the hold between said fusible metal and conductor to effect separation of the conductor and the heat absorbent mass from the center contact.

31. A thermal circuit interrupting device comprising a casing having a terminal and a center contact, a conductor extended between and electrically connecting said terminal and center contact and being connected with said center contact by a readily fusible mass that is in thermal association with the conductor and is attached to said center contact, said conductor adapted to be heated by sufficient current traversing it for a sufficient period of time to effect the heating of said fusible mass to cause it to release its hold upon said conductor, a heat absorbent mass thermally connected to said conductor, and spring means operative upon sufficient weakening of the hold between said fusible mass and conductor to effect separation of the conductor and heat absorbent mass from the center contact, said conductor comprising a fusible link having a portion adapted to fuse when the link is traversed by a sufficiently heavy current, said heat absorbing mass being attached to said fusible link between said portion adapted to fuse and said fusible mass.

HENRY T. BUSSMANN.